United States Patent
Lee et al.

(10) Patent No.: US 10,104,679 B2
(45) Date of Patent: Oct. 16, 2018

(54) APPARATUS AND METHOD FOR TRANSMITTING BROADCAST CHANNEL IN BROADBAND WIRELESS ACCESS SYSTEM

(75) Inventors: Mi-Hyun Lee, Seongnam-si (KR); Ji-Yun Seol, Seongnam-si (KR); Hyun-Kyu Yu, Gangnam-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 505 days.

(21) Appl. No.: 13/166,559

(22) Filed: Jun. 22, 2011

(65) Prior Publication Data

US 2011/0310761 A1    Dec. 22, 2011

(30) Foreign Application Priority Data

Jun. 22, 2010 (KR) .......................... 10-2010-0058904

(51) Int. Cl.
| | |
|---|---|
| *H04L 12/26* | (2006.01) |
| *H04W 72/12* | (2009.01) |
| *H04W 24/00* | (2009.01) |
| *H04W 48/08* | (2009.01) |
| *H04W 88/08* | (2009.01) |

(52) U.S. Cl.
CPC ............ *H04W 72/12* (2013.01); *H04W 24/00* (2013.01); *H04W 48/08* (2013.01); *H04W 88/08* (2013.01)

(58) Field of Classification Search
USPC ........................................ 370/252, 328, 329
See application file for complete search history.

(56) References Cited

U.S. PATENT DOCUMENTS

| | | | |
|---|---|---|---|
| 2006/0195576 A1* | 8/2006 | Rinne ................. | H04L 12/5695 709/226 |
| 2009/0290514 A1* | 11/2009 | Muharemovic ....... | H04W 48/12 370/256 |
| 2009/0305711 A1* | 12/2009 | Rinne ................. | H04L 12/5695 455/450 |
| 2010/0002631 A1 | 1/2010 | Cho et al. | |
| 2010/0226389 A1* | 9/2010 | Cho et al. ..................... | 370/465 |
| 2010/0329142 A1* | 12/2010 | Hao ................. | H04W 72/1284 370/252 |
| 2011/0058527 A1* | 3/2011 | Choi ..................... | H04L 5/0044 370/329 |

(Continued)

FOREIGN PATENT DOCUMENTS

| | | |
|---|---|---|
| KR | 10-2010-0028466 | 3/2010 |
| WO | WO 2010/058887 A1 | 5/2010 |

OTHER PUBLICATIONS

Notice of Patent Grant dated May 30, 2016 in connection with Korean Application No. 10-2010-0058904, 6 pages.

*Primary Examiner* — Asad Nawaz
*Assistant Examiner* — Najeebuddin Ansari

(57) ABSTRACT

To transmit and receive system information of a base station in a broadband wireless access system, operations of the base station include determining transmission periodicities of a plurality of system information subpackets periodically transmitted in a periodicity of two or more superframes, determining transmission offsets of the subpackets based on the transmission periodicities using a predefined rule for determining a transmission periodicity and a transmission offset, and transmitting the subpackets respectively according to the transmission periodicities and the transmission offsets.

16 Claims, 6 Drawing Sheets

(56) References Cited

U.S. PATENT DOCUMENTS

| | | | |
|---|---|---|---|
| 2011/0110398 A1* | 5/2011 | Zhang et al. | 375/132 |
| 2011/0149774 A1* | 6/2011 | Chen | H04L 1/1887 370/252 |
| 2011/0306335 A1* | 12/2011 | Yang | H04L 5/0007 455/422.1 |
| 2012/0093096 A1* | 4/2012 | Barbieri | H04J 3/1694 370/329 |
| 2012/0207073 A1* | 8/2012 | Kim | H04W 72/005 370/311 |

* cited by examiner

APPARATUS AND METHOD FOR TRANSMITTING BROADCAST CHANNEL IN BROADBAND WIRELESS ACCESS SYSTEM

CROSS-REFERENCE TO RELATED APPLICATION(S) AND CLAIM OF PRIORITY

The present application is related to and claims the benefit under 35 U.S.C. § 119(a) to a Korean patent application filed in the Korean Intellectual Property Office on Jun. 22, 2010, and assigned Serial No. 10-2010-0058904, the entire disclosure of which is hereby incorporated by reference.

TECHNICAL FIELD OF THE INVENTION

The present invention relates generally to a broadband wireless access system. More particularly, the present invention relates to an apparatus and a method for transmitting a broadband channel in the broadband wireless access system.

BACKGROUND OF THE INVENTION

Recent advances in broadband wireless access systems provide users with various services such as broadcasting, multimedia videos, and multimedia messages. In particular, a next-generation wireless mobile communication system is under development to provide users traveling fast with a data service over 100 Mbps and to provide users traveling slowly with a data service over 1 Gbps.

To enhance frequency transmission efficiency for providing high-rate data service, some broadband wireless access systems provide various methods for reducing control overhead. Institute of Electrical and Electronics Engineers (IEEE) 802.16m system adopting Orthogonal Frequency Division Multiple Access (OFDMA)/Orthogonal Frequency Division Multiplexing (OFDM) offers a broadcast channel called SuperFrame Header (SFH) at a fixed location of a frame so as to provide main system information and parameters.

FIG. 1 depicts the frame structure of the IEEE 802.16m system. A superframe 110 in FIG. 1 includes four frames 120. Each individual superframe 110 includes the SFH 130 in the first region. To reduce the control overhead, the SFH 130 includes Primary (P)-SFH and Secondary (S)-SFH at certain intervals. The P-SFH includes a superframe number and information for decoding the S-SFH. The S-SFH is divided into three subpackets (subpackets SP1, SP2 and SP3), and carries the main system information in different periodicities. The subpackets SP1, SP2, and SP3 are provided over one broadcast channel at different transmission intervals. The transmission periodicity of each subpacket S-SFH SPi is expressed as Equation 1.

$$P_1 < P_2 < P_3 \qquad \text{[Eqn. 1]}$$

In Equation 1, $P_i$ denotes the transmission periodicity of the subpacket S-SFH SPi.

To receive each subpacket, a mobile station obtains the periodicity of the subpacket and a transmission offset. In general, since the data size encoded with one codeword is restricted according to limitation of an interleaver size of the channel encoding used in the broadcast channel, the subpackets are scheduled to be transmitted one at a time in different superframes. The periodicity of the subpacket is known, as the system information, through the SP3 of the S-SFH. Hence, the mobile station can determine the transmission point of the subpacket by calculating only the offset value of the subpacket. For doing so, the mobile station receives each subpacket for at least one time and obtains the transmission offset by applying a modulo operation to the superframe index wherein the S-SFH subpacket is received by the periodicity value of the subpacket obtained through S-SFH SP3.

The method for obtaining the transmission offset information as discussed above can be applied without error when the subpacket is transmitted in conformity with its own periodicity. However, when the system information contained in the subpackets changes according to a communication environment, the IEEE 802.16m system permits to additionally transmit the subpacket including the changed system information out of the preset intervals, in order to promptly provide the changed information. As a result, the change of the system information may require additional transmission and cause confusion in the offset calculation. In this respect, a method for preventing the confusion in the offset calculation is demanded.

SUMMARY OF THE INVENTION

To address the above-discussed deficiencies of the prior art, it is a primary aspect of the present invention to provide an apparatus and a method for transmitting a broadcast channel in a broadband wireless access system.

Another aspect of the present invention is to provide an apparatus and a method for addressing confusion in transmission offset determination of subpackets carried over a broadcast channel in a broadband wireless access system.

Yet another aspect of the present invention is to provide an apparatus and a method for non-overlappingly transmitting subpackets over a broadcast channel in multiplier transmission periodicities in a broadband wireless access system.

Still another aspect of the present invention is to provide an apparatus and a method for determining a transmission offset based on a transmission periodicity of subpackets carried over a broadcast channel in a broadband wireless access system.

According to one aspect of the present invention, a method of a Base Station (BS) for transmitting system information in a broadband wireless access system includes determining transmission periodicities of a plurality of system information subpackets periodically transmitted in a periodicity of two or more superframes. The method also includes determining transmission offsets of the subpackets based on the transmission periodicities using a predefined rule for determining a transmission periodicity and a transmission offset. The method further includes transmitting the subpackets respectively according to the transmission periodicities and the transmission offsets. Units of the transmission periodicity and the transmission offset are the superframe.

According to another aspect of the present invention, a method of a Mobile Station (MS) for receiving system information in a broadband wireless access system includes obtaining information indicating transmission periodicities of a plurality of system information subpackets periodically received in a periodicity of two or more superframes. The method also includes determining transmission offsets of the subpackets based on the transmission periodicities, using a predefined rule for determining a transmission periodicity and a transmission offset. The method further includes determining a superframe carrying the subpackets according to the transmission periodicities and the transmission offsets. The method still further includes attempting to decode a corresponding subpacket in the superframe carrying the subpackets. Units of the transmission periodicity and the transmission offset are the superframe.

According to yet another aspect of the present invention, an apparatus of a base station (BS) in a broadband wireless access system includes a controller configured to determine transmission periodicities of a plurality of system information subpackets periodically transmitted in a periodicity of two or more superframes, and determine transmission offsets of the subpackets based on the transmission periodicities using a predefined rule for determining a transmission periodicity and a transmission offset. The BS also includes a modem configured to transmit the subpackets respectively according to the transmission periodicities and the transmission offsets. Units of the transmission periodicity and the transmission offset are the superframe.

According to still another aspect of the present invention, an apparatus of a mobile station (MS) in a broadband wireless access system includes a controller configured to obtain information indicating transmission periodicities of a plurality of system information subpackets periodically received in a periodicity of two or more superframes, determine transmission offsets of the subpackets based on the transmission periodicities, using a predefined rule for determining a transmission periodicity and a transmission offset, and determine a superframe carrying the subpackets according to the transmission periodicities and the transmission offsets. The MS also includes a modem configured to decode a corresponding subpacket in the superframe carrying the subpackets. Units of the transmission periodicity and the transmission offset are the superframe.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
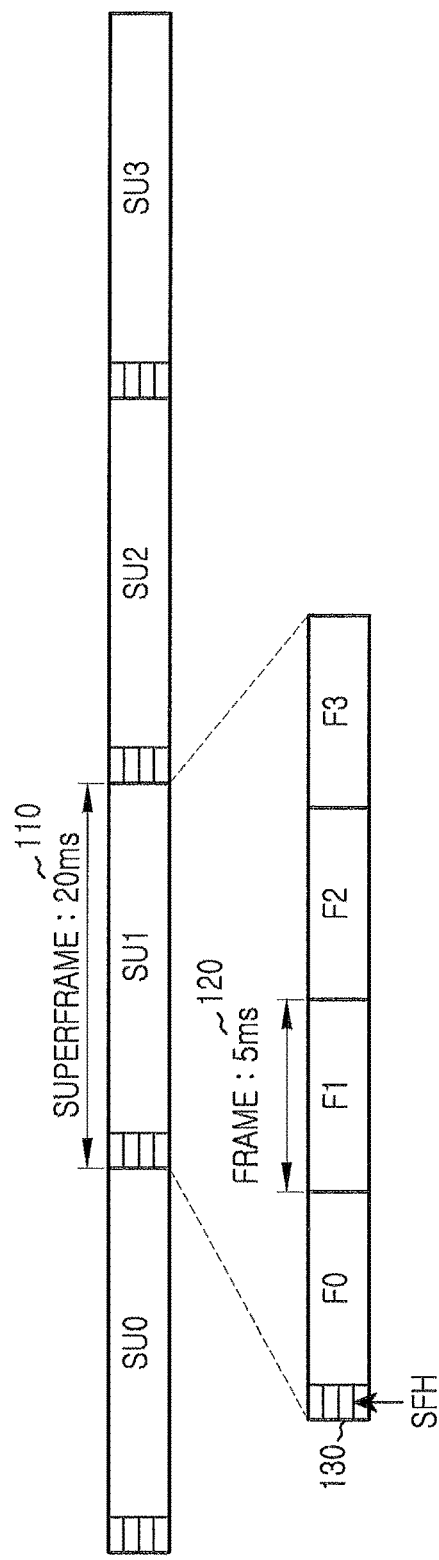
FIG. 1 illustrates a frame structure of an IEEE 802.16m system.

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged broadband wireless access system.

Exemplary embodiments of the present invention provide a technique for periodically transmitting a plurality of broadcast subpackets over one broadcast channel in a broadband wireless access system. That is, the present invention pertains to operations of a Base Station (BS) and a Mobile Station (MS) for periodically transmitting and receiving a plurality of broadcast subpackets over a single broadcast channel based on a superframe structure. Hereinafter, an Orthogonal Frequency Division Multiplexing (OFDM)/Orthogonal Frequency Division Multiple Access (OFDMA) wireless communication system is exemplified.

In the system, each superframe includes one or more frames. Each frame includes one or more subframes. The subframe includes one or more OFDMA symbols.

When a plurality of subpackets is transmitted over one broadcast channel, the present invention provides a method for transmitting the S-SFH subpackets such that channel coding does not exceed capacity and the subpackets do not overlap with each other. To periodically transmit the subpackets over one broadcast channel in different periodicities such that the subpackets do not overlap with each other, the subpackets should be transmitted over different superframes on the time basis. To periodically transmit the different subpackets at certain time intervals without overlapping each other, it is advantageous that the transmission periodicity is a multiplier of the transmission periodicity of the other subpackets. Concurrently, the subpackets should have different transmission offsets. Specifically, it is advantageous that the transmission periodicity of a SubPacket (SP)1 which is the shortest transmission periodicity, is longer or equal to two superframes so as to divide one space into two. It is advantageous that the transmission periodicity of the SP2, which is longer than the transmission periodicity of the SP1, is longer than the transmission periodicity of the SP1 by an integer multiple, based on the longer transmission periodicity of the SP3. It is advantageous that the transmission periodicity of the SP3 is longer than the transmission periodicity of the SP2 by an integer multiple to attain the different periodicity while not overlapping with the other subpackets. This relation of the transmission periodicities can be expressed as Equation 2.

$$P_1 = L$$

$$P_2 = M \times P_1$$

$$P_3 = N \times P_2 \quad \text{[Eqn. 2]}$$

In Equation 2, $P_i$ denotes the transmission periodicity of the SPi, and L, M, and N denote factors for determining the transmission periodicity. L, M, and N can vary according to a communication environment and are set to integers greater than or equal to 2.

When L is equal to 2 and M and N are greater than or equal to 2, the transmission periodicities of the subpackets are arranged as shown in Table 1.

TABLE 1

| | Transmission periodicity | | |
|---|---|---|---|
| Index | SP1 | SP2 | SP3 |
| 0 | 40 ms (L = 2, $P_1$ = 2) | 80 ms (M = 2, $P_2$ = 4) | 160 ms (N = 2, $P_3$ = 8) |
| 1 | 40 ms (L = 2, $P_1$ = 2) | 80 ms (M = 2, $P_2$ = 4) | 320 ms (N = 4, $P_3$ = 16) |
| 2 | 40 ms (L = 2, $P_1$ = 2) | 80 ms (M = 2, $P_2$ = 4) | 240 ms (N = 3, $P_3$ = 12) |
| 3 | 40 ms (L = 2, $P_1$ = 2) | 120 ms (M = 3, $P_2$ = 6) | 240 ms (N = 2, $P_3$ = 12) |
| 4 | 40 ms (L = 2, $P_1$ = 2) | 120 ms (M = 3, $P_2$ = 6) | 360 ms (N = 3, $P_3$ = 18) |
| 5 | 40 ms (L = 2, $P_1$ = 2) | 120 ms (M = 3, $P_2$ = 6) | 480 ms (N = 4, $P_3$ = 24) |
| 6 | 40 ms (L = 2, $P_1$ = 2) | 160 ms (M = 4, $P_2$ = 8) | 320 ms (N = 2, $P_3$ = 16) |
| ... | ... | ... | ... |

Alternatively, when L is equal to 3 and M and N are greater than or equal to 2, the transmission periodicities of the subpackets are arranged as shown in Table 2.

TABLE 2

| | Transmission periodicity | | |
|---|---|---|---|
| Index | SP1 | SP2 | SP3 |
| 0 | 60 ms (L = 3) | 120 ms (M = 2) | 240 ms (N = 2) |
| 1 | 60 ms (L = 3) | 120 ms (M = 2) | 360 ms (N = 3) |
| 2 | 60 ms (L = 3) | 120 ms (M = 2) | 480 ms (N = 4) |
| 3 | 60 ms (L = 3) | 180 ms (M = 3) | 360 ms (N = 2) |
| 4 | 60 ms (L = 3) | 180 ms (M = 3) | 540 ms (N = 3) |
| 5 | 60 ms (L = 3) | 240 ms (M = 4) | 480 ms (N = 4) |
| ... | ... | ... | ... |

In Table 1 and Table 2, the periodicity is expressed in milliseconds (ms). The present invention assumed that a length of a superframe is 20 ms, and thus periodicities in Table 1 and Table 2 are converted to ms from superframes. Table 1 or Table 2 shows the examples when the periodicity of the SP1 is 40 ms and 60 ms respectively. Yet, in another embodiment of the invention, the transmission periodicity of the SP1 can be a value satisfying the multiple of 20 ms and the periodicity of the subpackets can be set to the multiple of the transmission periodicity of the SP1 as described above.

In the wireless access system including a plurality of BSs, the SP1 transmission periodicities of the BSs can be the same or different from each other. For example, the transmission periodicity of the SP1 can vary according to a cell type such as macrocell, femtocell, and picocell.

The transmission point of the subpacket of the periodicity as shown in Table 1 or Table 2 can be given by Equation 3.

$$s_i = P_i \times k + O_i \quad \text{[Eqn. 3]}$$

In Equation 3, $s_i$ denotes a superframe index carrying the SPi, $P_i$ denotes the transmission periodicity of the SPi, $O_i$ denotes the transmission offset of the SPi, and k denotes an integer such as 0, 1, 2, 3, . . . . Herein, the transmission offset value $O_i$ can be one of 0 through $P_i-1$. Advantageously, the transmission offset $O_i$ is set not to overlap with the other subpackets.

When the plurality of the subpackets is transmitted periodically, the transmission offsets of the subpackets are differently set. For example, in the system according to an embodiment, the transmission offsets are multiplied to transmit the subpackets without overlapping with each other. Thus, the subpackets are transmitted over one broadcast channel using the different transmission periodicities and the transmission offsets determined from the different transmission periodicities. By determining the transmission offset according to the transmission periodicity, it is possible to transmit the subpackets without overlapping with each other and to alleviate computational complexity in receiving the corresponding subpacket for multiple times to determine the transmission offset.

The method for determining the transmission offset is given by Equation 4.

$$O_1 = 0$$

$$O_2 = P_1 - 1$$

$$O_3 = P_2 - 1 \quad \text{[Eqn. 4]}$$

In Equation 4, $P_i$ denotes the transmission periodicity of the SPi and $O_i$ denotes the transmission offset of the SPi.

According to Equation 4, the transmission offset of the SP1 is zero, the transmission offset of the SP2 is $P_1-1$ where the SP1 is not transmitted, and the transmission offset of the SP3 is $P_2-1$ where the SP1 and the SP2 are not transmitted. Alternatively, the transmission offset of the SP1 can be set to one of 0 through $P_1-1$. With the transmission periodicity and the transmission offset, the superframe scheduled with the subpackets is expressed as Equation 5.

$$s_1 = (P_1 \times k + 0) \bmod SFN_{max}$$

$$s_2 = (P_2 \times k + P_1 - 1) \bmod SFN_{max}$$

$$s_3 = (P_3 \times k + P_2 - 1) \bmod SFN_{max} \quad \text{[Eqn. 5]}$$

In Equation 5, $s_i$ denotes the superframe number carrying the SPi, $P_i$ denotes the transmission periodicity of the SPi, k denotes an integer such as 0, 1, 2, 3, . . . , and $SFN_{max}$ denotes the maximum value of the superframe number. For example, when the SFN is a 12-bit indicator, $SFN_{max}$ is 4095 because the SFN can represent 0 through 4095.

As expressed in Equation 5, the superframe number for carrying the subpacket is defined based on the transmission periodicity and the transmission offset. Accordingly, there is no need to change the transmission offset per boundary of the SFN in order to maintain the periodic transmission characteristic. The MS can acquire which subpacket is transmitted over which superframe, based on the operation value of the transmission periodicity and the transmission offset for the superframe number as expressed in Equation 6, Equation 7, and Equation 8.

The SP1 is carried by the superframe of the SFN meeting Equation 6.

$$SFN \bmod P_1 = 0 \quad \text{[Eqn. 6]}$$

In Equation 6, SFN denotes the superframe number and $P_1$ denotes the transmission periodicity of the SP1.

The SP2 is carried by the superframe of the SFN meeting Equation 7.

$$\text{SFN mod } P_2 = P_1 - 1 \quad [\text{Eqn. 7}]$$

In Equation 7, SFN denotes the superframe number, $P_1$ denotes the transmission periodicity of the SP1, and $P_2$ denotes the transmission periodicity of the SP2.

The SP3 is carried by the superframe of the SFN meeting Equation 8.

$$\text{SFN mod } P_3 = P_2 - 1 \quad [\text{Eqn. 8}]$$

In Equation 8, SFN denotes the superframe number, $P_2$ denotes the transmission periodicity of the SP2, and $P_3$ denotes the transmission periodicity of the SP3.

Figure 2:
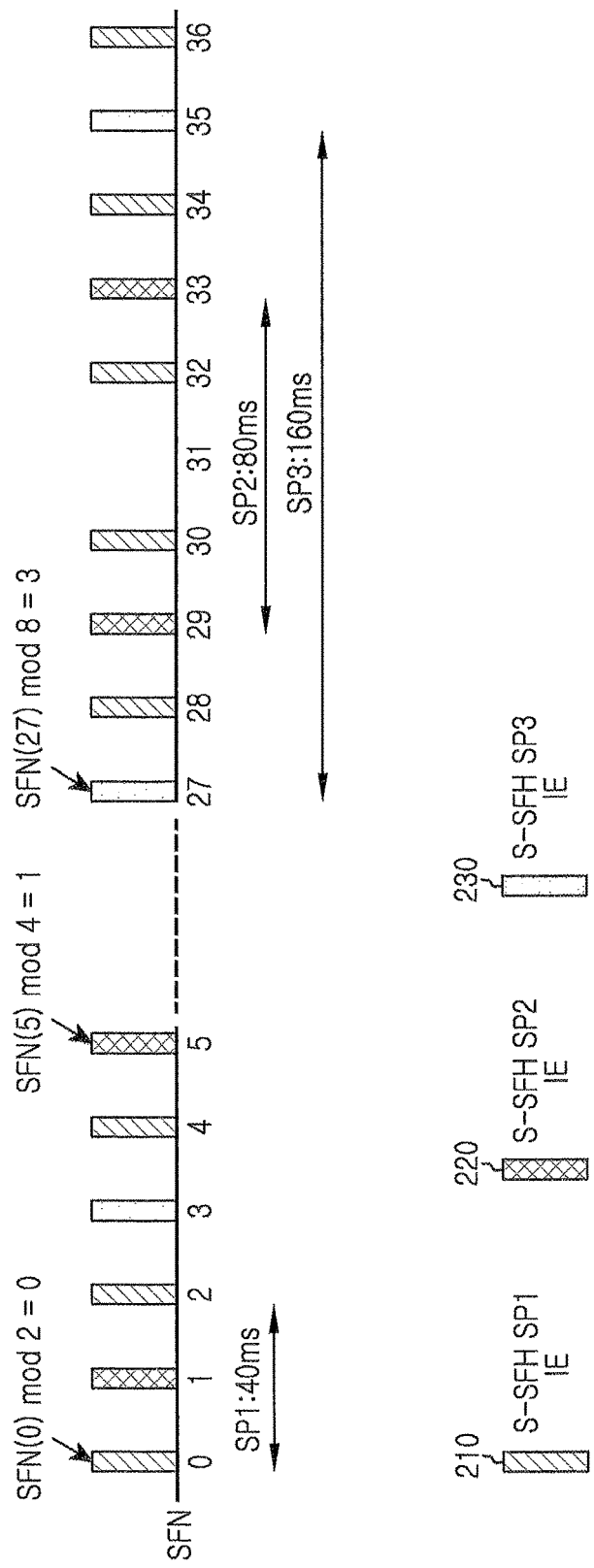
FIG. 2 illustrates transmission of S-SFH subpackets including system information in a broadband wireless access system according to an embodiment of the present invention.

FIG. 2 illustrates transmission of the subpackets including system information in the broadband wireless access system according to an embodiment of the present invention.

Three broadcast subpackets SP1 210, SP2 220, and SP3 230 are transmitted over one Secondary-SuperFrame Header (S-SFH) channel. The SP1, SP2, and SP3 have periodicities of 40 ms, 80 ms, and 160 ms respectively. That is, the transmission periodicities of the subpackets are P1=2, P2=4, and P=8, which are multiplied from the minimum transmission periodicity. Based on Equation 6, Equation 7, and Equation 8, the SP1 is transmitted over the 0-th, second, and fourth superframes where the modulo operation result of the P1 is 0, the SP2 is transmitted over the first, fifth, and ninth superframes where the modulo operation result of the P2 is 1, and the SP3 is transmitted over the third, eleventh, and nineteenth superframes where the modulo operation result of the P3 is 3.

Although it is not depicted in FIG. 2, a Primary (P)-SFH is transmitted in every superframe. The P-SFH occupies a certain fixed region of the SFH channel, and resources occupied by the SPi physically or logically follow the resource occupied by the P-SFH. Hence, the MS decodes the corresponding SPi from the signal received over the resource following the resource occupied by the P-SFH in the superframe corresponding to the transmission periodicity and the transmission offset of the SPi.

Based on Equation 5, the subpacket is delivered by the superframe given by Equation 9.

$$s_1 = 2 \times k + 0$$

$$s_2 = 4 \times k + 1$$

$$s_3 = 8 \times k + 3 \quad [\text{Eqn. 9}]$$

In Equation 9, $s_i$ denotes the superframe index of the scheduled SPi, and k denotes an integer such as 0, 1, 2, 3, . . . .

Alternatively, the transmission offset of the SP1 can be set to a different number other than zero. For example, when the transmission offset of the SP1 is set to $P_1-1$, the transmission offset of the SP2 can be set to $P_1$ where the SP1 is not transmitted and the transmission offset of the SP3 can be set to $P_2$ where the SP1 and the SP2 are not transmitted.

For instance, when the transmission offset of the SP1 is set to $P_1-1$, the transmission offset of the subpacket is given by Equation 10.

$$O_1 = P_1 - 1$$

$$O_2 = P_1$$

$$O_3 = P_2 \quad [\text{Eqn. 10}]$$

In Equation 10, $P_i$ denotes the transmission periodicity of the SPi and $O_i$ denotes the transmission offset of the SPi.

Now, operations and structures of the BS and the MS for transmitting and receiving the system information as stated above are explained by referring to the drawings.

Figure 3:
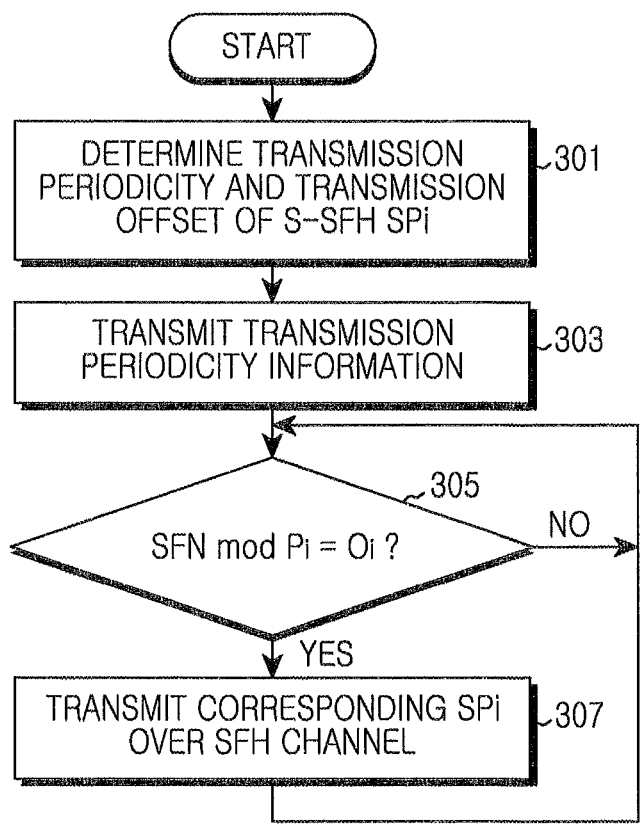
FIG. 3 illustrates operations of a base station for transmitting the system information in the broadband wireless access system according to an embodiment of the present invention.

FIG. 3 illustrates operations of a BS for transmitting the system information in the broadband wireless access system according to an embodiment of the present invention.

In step 301, the BS determines the transmission periodicity and the transmission offset for each SPi of the S-SFH. Herein, the transmission periodicity and the transmission offset have a relation according to a predefined rule. That is, the transmission offset is determined based on the transmission periodicity according to the predefined rule. The transmission periodicity is determined not to overlap the SPi. For example, the transmission periodicities of the SPi are multiplied. In other words, the transmission periodicities of the SPi are determined by multiplying a minimum transmission periodicity by different integers. The minimum transmission periodicity can vary according to the cell type of the BS. The transmission offsets are determined using the transmission periodicity of the other SPi. For example, the transmission periodicities can be determined as shown in Table 1 or Table 2, and the transmission offsets can be determined based on Equation 4 or Equation 10.

In step 303, the BS transmits transmission periodicity information of the SPi. For example, the transmission periodicity information can be transmitted through one of the SPi. In so doing, the transmission periodicity information can be constituted to explicitly indicate the transmission periodicities of the SPi, or only with the index indicating a particular row of the predefined table as shown in Table 1 or Table 2.

When a new superframe commences, the BS determines whether the modulo operation result of the SFN and the transmission periodicity of the SPi is equal to the transmission offset of the SPi in step 305. That is, the BS performs the modulo operation as many times as the SPi and determines whether each result is equal to the transmission offset of the corresponding SPi; that is, whether it is the superframe to carry the corresponding SPi.

When the modulo operation result is equal to the transmission offset of the corresponding SPi (that is, when it is the superframe to carry the corresponding SPi), the BS transmits the corresponding SPi over the SFH channel in step 307. Namely, the BS generates an Information Element (IE) using the system information to be included to the corresponding SPi, encodes the IE, and then transmits the encoded IE over the SFH channel positioned in the very front of the superframe. For example, the SPi IE can be encoded according to a Tail-Byte Convolution Code (TBCC) scheme. Although it is not illustrated in FIG. 3, the BS transmits the P-SFH over the SFH channel in every superframe.

Figure 4:
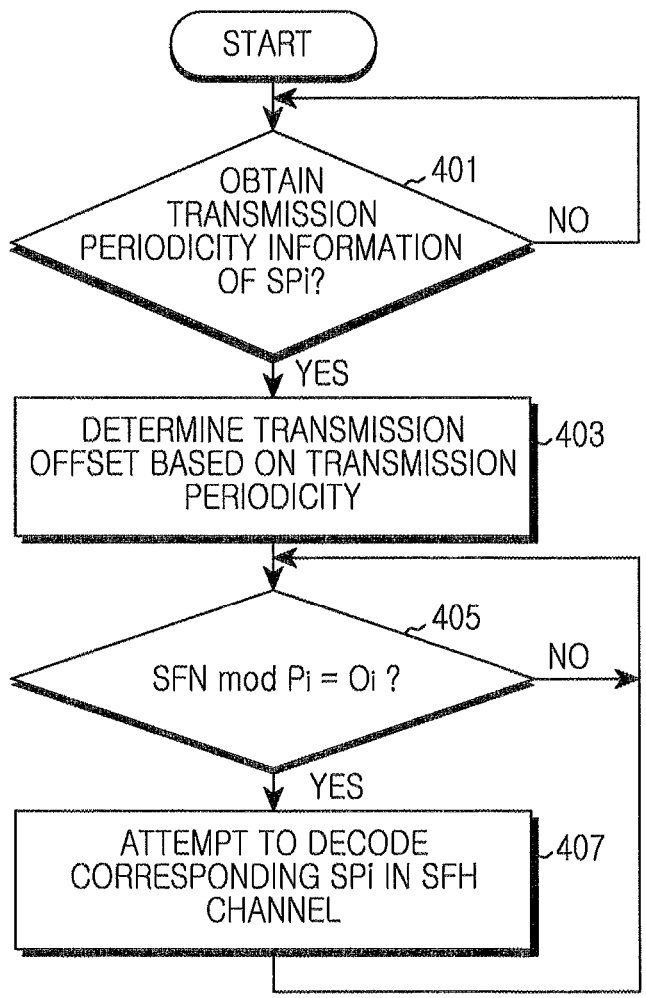
FIG. 4 illustrates operations of a mobile station for receiving the system information in the broadband wireless access system according to an embodiment of the present invention.

FIG. 4 illustrates operations of a MS for receiving the system information in the broadband wireless access system according to an embodiment of the present invention.

In step 401, the MS checks whether the transmission periodicity information of each SPi is received. For example, the transmission periodicity information can be received through one of the SPi. The transmission periodicity information can be constituted to explicitly indicate the transmission periodicities of the SPi, or only with the index indicating the particular row of the predefined table as shown in Table 1 or Table 2.

Upon receiving the transmission periodicity information, the MS confirms the transmission periodicities of the SPi in the transmission periodicity information and determines the transmission offset of the SPi based on the transmission periodicities in step 403. That is, the transmission periodicity and the transmission offset have a relation according to the predefined rule. For example, the transmission offsets are determined based on Equation 4 or Equation 10.

When a new superframe commences, the MS determines whether the modulo operation result of the SFN and the transmission periodicity of the SPi is equal to the transmission offset of the SPi in step 405. That is, the BS performs the modulo operation as many times as the SPi and determines whether each result is equal to the transmission offset of the corresponding SPi; that is, whether it is the superframe to carry the corresponding SPi.

When the modulo operation result is equal to the transmission offset of the corresponding SPi (that is, when it is the superframe to carry the corresponding SPi), the MS attempts to decode the corresponding SPi from the signal received over the SFH channel in step 407. That is, the MS restores the SPi IE by demodulating and decoding the signal received over the SFH channel and obtains the system information by analyzing the SPi IE. Although it is not illustrated in FIG. 4, the MS receives the P-SFH over the SFH channel in every superframe.

Figure 5:
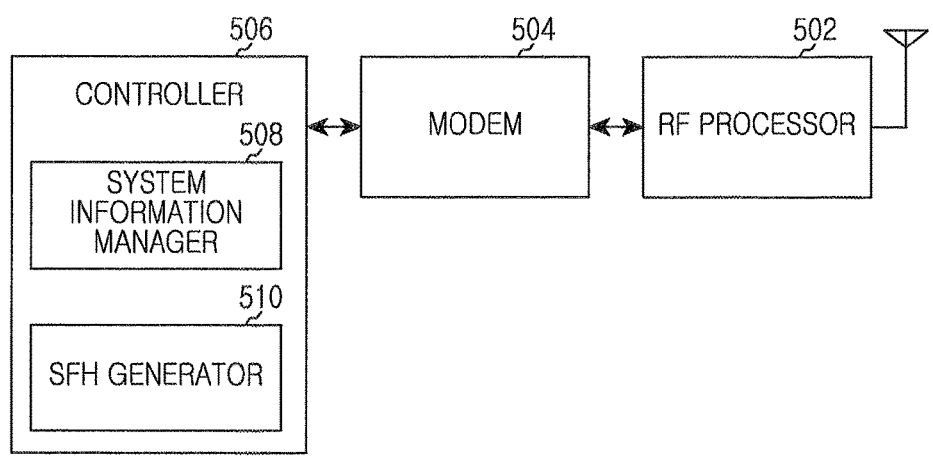
FIG. 5 illustrates a base station for transmitting the system information in the broadband wireless access system according to an embodiment of the present invention.

FIG. 5 is a block diagram of a BS for transmitting the system information in the broadband wireless access system according to an embodiment of the present invention.

The BS of FIG. 5 includes a Radio Frequency (RF) processor 502, a modem 504, and a controller 506.

The RF processor 502 functions, for example, to convert the signal band and amplify the signal, and to transmit and receive signals over a radio channel. In detail, the RF processor 502 up-converts a baseband signal output from the modem 504 to an RF signal, sends the RF signal over an antenna, and down-converts an RF signal received via the antenna to a baseband signal.

The modem 504 converts the baseband signal and the bit sequence according to a physical layer standard of the system. For example, in the data transmission, the modem 504 generates complex symbols by encoding and modulating a transmit bit sequence, maps the complex symbols to subcarriers, and constitutes OFDM symbols through Inverse Fast Fourier Transform (IFFT) and Cyclic Prefix (CP) insertion. In the data reception, the modem 504 splits the baseband signal output from the RF processor 502 into OFDM symbols, restores the signals mapped to the subcarriers through FFT, and restores the receive bit sequence using the demodulation and the decoding. In particular, the modem 504 encodes the SPi of the P-SFH and the S-SFH transmitted over the SFH channel positioned in the very front of the superframe. For example, the SPi IE can be encoded in conformity with the TBCC scheme.

The controller 506 controls functions of the BS. For example, the controller 506 generates and provides the modem 504 with downlink traffic burst and control message, restores a high-layer packet from uplink traffic burst provided from the modem 504, and analyzes the control message. More specifically, the controller 506 controls to transmit the P-SFH and the S-SFH including the system information, specifically, the SPi of the S-SFH.

To broadcast the SPi, the controller 506 determines the transmission periodicity and the transmission offset for each SPi. For instance, the transmission periodicities of the SPi are multiplied, and the transmission offsets are determined using the transmission periodicity of the other SPi. For example, the transmission periodicities can be determined as shown in Table 1 or Table 2, and the transmission offsets can be determined based on Equation 4 or Equation 10. Next, the controller 506 transmits the transmission periodicity information of the SPi via the modem 504 and the RF processor 502. The transmission periodicity information can be constituted to explicitly indicate the transmission periodicities of the SPi, or only with the index indicating the particular row of the predefined table as shown in Table 1 or Table 2. In every start of the superframe, the controller 506 determines whether the modulo operation result of the SFN and the transmission periodicity of the SPi is equal to the transmission offset of the SPi and thus determines whether it is the superframe to carry the corresponding SPi. When it is the superframe to carry the corresponding SPi according to the modulo operation result, a system information manager 508 of the controller 506 collects the system information to include to the corresponding SPi, an SFH generator 510 generates the IE including the collected system information, and the controller 506 transmits the IE via the modem 504 and the RF processor 502.

Figure 6:
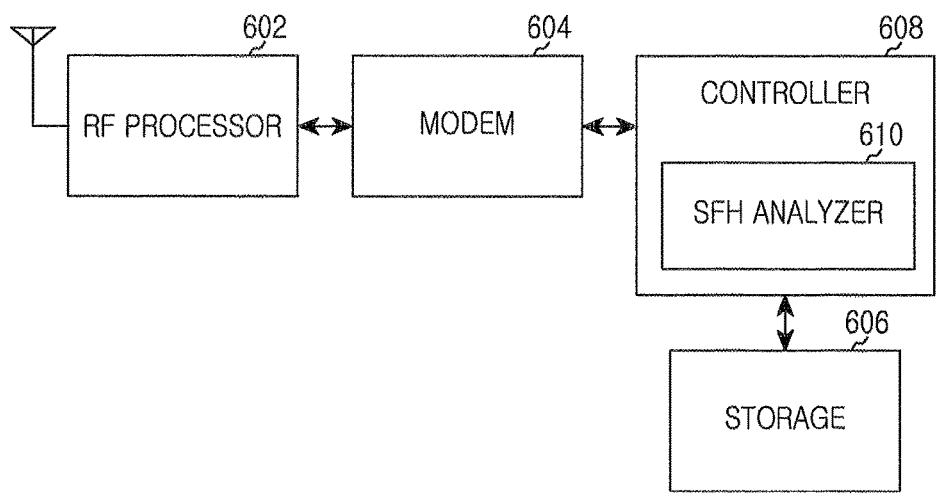
FIG. 6 illustrates a mobile station for receiving the system information in the broadband wireless access system according to an embodiment of the present invention.

FIG. 6 is a block diagram of a MS for receiving the system information in the broadband wireless access system according to an embodiment of the present invention.

The MS of FIG. 6 includes an RF processor 602, a modem 604, a storage 606, and a controller 608.

The RF processor 602 functions, for example, to convert the signal band and amplify the signal, and to transmit and receive signals over a radio channel. In detail, the RF processor 602 up-converts a baseband signal output from the modem 604 to an RF signal, sends the RF signal over an antenna, and down-converts an RF signal received via the antenna to a baseband signal.

The modem 604 converts the baseband signal and the bit sequence according to a physical layer standard of the system. For example, in the data transmission, the modem 604 generates complex symbols by encoding and modulating the transmit bit sequence, maps the complex symbols to subcarriers, and constitutes OFDM symbols through the IFFT and the CP insertion. In the data reception, the modem 604 splits the baseband signal output from the RF processor 602 into OFDM symbols, restores the signals mapped to the subcarriers through FFT, and restores the receive bit sequence using the demodulation and the decoding. In particular, the modem 604 decodes the SPi of the P-SFH and the S-SFH received over the SFH channel positioned in the very front of the superframe. For example, the SPi IE can be decoded in conformity with the TBCC scheme.

The storage 606 stores program images, microcodes, temporary data, and configuration data associated with the operations of the MS. In specific, the storage 606 stores the system information for the communication with the BS, and updates the stored system information when new system information is provided from the controller 608.

The controller 608 controls functions of the MS. For example, the controller 608 generates and provides the modem 604 with uplink traffic burst and control message, restores the high-layer packet from the downlink traffic burst output from the modem 604, and analyzes the control message. Particularly, the controller 608 controls to obtain the system information from the P-SFH and the S-SFH including the system information, particularly, from the SPi of the S-SFH.

To acquire the system information from the SPi, the controller 608 obtains the periodicity information of each SPi received from the BS. For example, the transmission periodicity information can be received over one of the SPi. Herein, the transmission periodicity information can be constituted to explicitly indicate the transmission periodicities of the SPi, or only with the index indicating the particular row of the predefined table as shown in Table 1 or Table 2. After obtaining the transmission periodicity information, the controller 608 confirms the transmission periodicities of the SPi in the transmission periodicity information and determines the transmission offset of the SPi based on the transmission periodicities. For example, the transmission offsets can be determined based on Equation 4 or Equation 10. Next, when the superframe starts, the controller 608 determines whether it is the superframe carrying the corresponding SPi by determining whether the modulo operation result of the SFN and the transmission periodicity of the SPi is equal to the transmission offset of the SPi. When determining the superframe carrying the corresponding SPi according to the modulo operation result, the controller 608 controls the modem 604 to attempt to decode the corresponding SPi from the signal received over the SFH channel. When the SPi IE is provided from the modem 604, an SFH analyzer 610 of the controller 608 obtains the system information by analyzing the SPi IE and the controller 608 provides the system information to the storage 606.

The broadband wireless access system can efficiently provide the plurality of the broadcast subpackets over the single broadcast channel according to the multiplied transmission periodicities not to overlap the broadcast subpackets. When the broadcast packets are periodically transmitted, the transmission offset of the transmit broadcast subpacket is determined according to the transmission periodicity. Advantageously, it is possible to reduce the complexity in detecting the corresponding broadcast packet more than once to obtain the transmission offset and to reduce the decoding power consumption.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a base station for transmitting system information in a wireless communication system, the method comprising:
    transmitting system information for a first periodicity and a second periodicity which is a multiple of the first periodicity;
    transmitting a first subpacket according to the first periodicity and a first offset; and
    if a modulo operation result of a superframe number of a superframe with the second periodicity is equal to a second offset, transmitting a second subpacket according to the second periodicity, at the superframe,
    wherein the system information is carried in a plurality of subpackets comprising the first subpacket and the second subpacket,
    wherein the second offset is identified as being equal to a value which is smaller than the first periodicity if the first offset is zero, and
    wherein the second offset is identified as being equal to the first periodicity if the first offset is not zero and smaller than the first periodicity.

2. The method of claim 1,
    wherein the second offset is identified by a mobile station receiving the first subpacket and the second subpacket based on the first periodicity and the first offset.

3. The method of claim 1, wherein transmitting the system information for the first periodicity and the second periodicity comprises:
    transmitting additional information for an index before transmitting the first subpacket,
    wherein the transmitted index indicates a row of a predefined table including a plurality of periodicity sets,
    wherein the row indicates the first periodicity and the second periodicity among the plurality of periodicity sets, and
    wherein the predefined table does not include a plurality of offsets corresponding to the plurality of periodicity sets.

4. The method of claim 1,
    wherein the first periodicity is determined by multiplying an allotted time for a superframe by two or more, and
    wherein the superframe comprises the system information.

5. The method of claim 1, wherein the transmitting of the second subpacket comprises:
    encoding the second subpacket; and
    broadcasting the encoded second subpacket at a subframe.

6. The method of claim 1, further comprising:
    transmitting a third subpacket according to a third periodicity and a third offset,
    wherein the third periodicity is a multiple of the second periodicity, and
    wherein the first offset, the second offset, and the third offset are identified according to an equation (1) or an equation (2)

$$O_1=0 \quad O_1=P_1-1$$

$$O_2=P_1-1 \text{ or} \qquad \text{equation (1)}$$

$$O_2=P_1 \qquad \text{equation (2)}$$

$$O_3=P_2-1 \quad O_3=P_2$$

where $O_1$ represents the first offset, $O_2$ represents the second offset, $O_3$ represents the third offset, $P_1$ represents the first periodicity, and $P_2$ represents the second periodicity.

7. An apparatus of a base station for transmitting system information in a wireless communication system, the apparatus comprising:
    at least one processor; and
    at least one transceiver operatively coupled with the at least one processor,
    wherein the at least one transceiver is configured to:
        transmit periodicity information for a first periodicity and a second periodicity which is a multiple of the first periodicity,
        transmit a first subpacket according to the first periodicity and a first offset, and
        transmit, if a modulo operation result of a superframe number of a superframe with the second periodicity is equal to a second offset, a second subpacket according to the second periodicity at the superframe,
    wherein the system information is carried in a plurality of subpackets comprising the first subpacket, and the second subpacket,
    wherein the second offset is identified as being equal to a value which is smaller than the first periodicity if the first offset is zero, and
    wherein the second offset is identified as being equal to the first periodicity if the first offset is not zero and smaller than the first periodicity.

8. The apparatus of claim 7,
wherein the second offset is identified by a mobile station receiving the first subpacket and the second subpacket based on the first periodicity and the first offset.

9. The apparatus of claim 8, wherein the at least one processor is configured to transmit additional information for an index before the transmission of the first subpacket,
wherein the transmitted index indicates a row of a predefined table including a plurality of periodicity sets,
wherein the row indicates the first periodicity and the second periodicity among the plurality of periodicity sets, and
wherein the predefined table does not include a plurality of offsets corresponding to the plurality of periodicity sets.

10. The apparatus of claim 7,
wherein the first periodicity is determined by multiplying an allotted time for a superframe by two or more, and
wherein the superframe comprises the system information.

11. The apparatus of claim 7, wherein the at least one processor is configured to:
encode the second subpacket if the modulo operation result is equal to the second offset; and
wherein the at least one transceiver is configured to transmit the encoded second subpacket at a subframe.

12. The apparatus of claim 7, wherein the at least one transceiver is further configured to:
transmit a third subpacket according to a third periodicity and a third offset,
wherein the third periodicity is a multiple of the second periodicity, and
wherein the first offset, the second offset, and the third offset are identified according to an equation (1) or an equation (2)

$$O_1=0 \quad O_1=P_1-1$$

$$O_2=P_1-1 \text{ or} \quad \text{equation (1)}$$

$$O_2=P_1 \quad \text{equation (2)}$$

$$O_3=P_2-1 \quad O_3=P_2$$

where $O_1$ represents the first offset, $O_2$ represents the second offset, $O_3$ represents the third offset, $P_1$ represents the first periodicity, and $P_2$ represents the second periodicity.

13. An apparatus of a mobile station for receiving system information in a wireless communication system, the apparatus comprising:
at least one processor; and
at least one transceiver operatively coupled with the at least one processor,
wherein the at least one transceiver is configured to:
receive, from a base station, periodicity information for a first periodicity and a second periodicity which is a multiple of the first periodicity; and
receive, from the base station, a first subpacket according to the first periodicity and a first offset, and
wherein the at least one processor is configured to:
identify a second offset as being equal to a value which is smaller than the first periodicity if the first offset is zero; and
identify the second offset as being equal to the first periodicity if the first offset is not zero and smaller than the first periodicity,
wherein the at least one transceiver is further configured to if a modulo operation result of a superframe number of a superframe with the second periodicity is equal to the identified second offset, receive, from the base station, a second subpacket according to the second periodicity at the superframe,
wherein the system information is carried in a plurality of subpackets comprising the first subpacket and the second subpacket.

14. The apparatus of claim 13,
wherein the at least one transceiver is configured to receive additional information for an index before the reception of the first subpacket,
wherein the index indicates a row of a predefined table including a plurality of periodicity sets,
wherein the row indicates the first periodicity and the second periodicity among the plurality of periodicity sets, and
wherein the predefined table does not include a plurality of offsets corresponding to the plurality of periodicity sets.

15. The apparatus of claim 13, wherein the at least one processor is configured to:
decode the second subpacket.

16. The apparatus of claim 13, wherein the at least one transceiver is further configured to receive, from the base station, a third subpacket according to a third periodicity and a third offset,
wherein the third periodicity is a multiple of the second periodicity, and
wherein the first offset, the second offset, and the third offset are determined according to an equation (1) or an equation (2)

$$O_1=0 \quad O_1=P_1-1$$

$$O_2=P_1-1 \text{ or} \quad \text{equation (1)}$$

$$O_2=P_1 \quad \text{equation (2)}$$

$$O_3=P_2-1 \quad O_3=P_2$$

where $O_1$ represents the first offset, $O_2$ represents the second offset, $O_3$ represents the third offset, $P_1$ represents the first periodicity, and $P_2$ represents the second periodicity.

* * * * *